US006943910B2

(12) United States Patent
Tanimoto

(10) Patent No.: US 6,943,910 B2
(45) Date of Patent: Sep. 13, 2005

(54) WEB SERVER AND FACSIMILE MACHINE HAVING WEB SERVER FUNCTION

(75) Inventor: Yoshifumi Tanimoto, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 786 days.

(21) Appl. No.: 09/871,888

(22) Filed: May 31, 2001

(65) Prior Publication Data

US 2002/0051187 A1 May 2, 2002

(30) Foreign Application Priority Data

Jun. 5, 2000 (JP) ........................................ 2000-167199

(51) Int. Cl.[7] ............................ G06K 15/00; H04N 1/40

(52) U.S. Cl. ...................... 358/1.15; 358/468; 358/404; 358/444

(58) Field of Search ................................ 358/1.15, 400, 358/403, 468, 407, 404, 444; 379/100.01, 100.02, 90.02

(56) References Cited

U.S. PATENT DOCUMENTS

| 5,761,507 | A | * | 6/1998 | Govett ........................ 718/101 |
| 6,460,084 | B1 | * | 10/2002 | Van Horne et al. ......... 709/227 |
| 2001/0047392 | A1 | * | 11/2001 | Murphy, Jr. et al. ........ 709/208 |

FOREIGN PATENT DOCUMENTS

| JP | 11-055448 | 2/1999 |
| JP | 11-338798 | 12/1999 |

* cited by examiner

Primary Examiner—Jerome Grant, II
(74) Attorney, Agent, or Firm—Hogan & Harrison, LLP

(57) ABSTRACT

A facsimile server machine that is easy to access from a client personal computer but does not allow the client personal computer to rewrite machine settings without authentication. The facsimile server machine includes a controller for executing a plurality of HTTP tasks. Each HTTP task has a port number. The controller decides which HTTP task should be executed based on instructing information from a client personal computer and a port number appended to that HTTP task. The relationship between the HTTP task port numbers and the client personal computers is defined in a table created in the machine. The controller refers to the table when executing the HTTP task, using the specified information.

10 Claims, 5 Drawing Sheets

FACSIMILE SYSTEM

FIG. 4

HTTP TASK TABLE:9b

| TASK NO. | PORT NO. | USE | AUTHENTICATION | URL | PRIORITY ORDER |
|---|---|---|---|---|---|
| HTTP TASK T1 | 80 | GENERAL | DEACTIVATED | http://xxxxxx/ | 3 |
| HTTP TASK T2 | 5000 | MAINTENANCE ONLY | ACTIVATED | http://xxxxxx:5000/ | 1 |
| HTTP TASK T3 | 5001 | CLIENT A ONLY | ACTIVATED | http://xxxxxx:5001/ | 4 |
| HTTP TASK T4 | 5002 | CLIENT B ONLY | ACTIVATED | http://xxxxxx:5002/ | 4 |
| HTTP TASK T5 | 5003 | USER ADMINISTRATION ONLY | ACTIVATED | http://xxxxxx:5003/ | 2 |

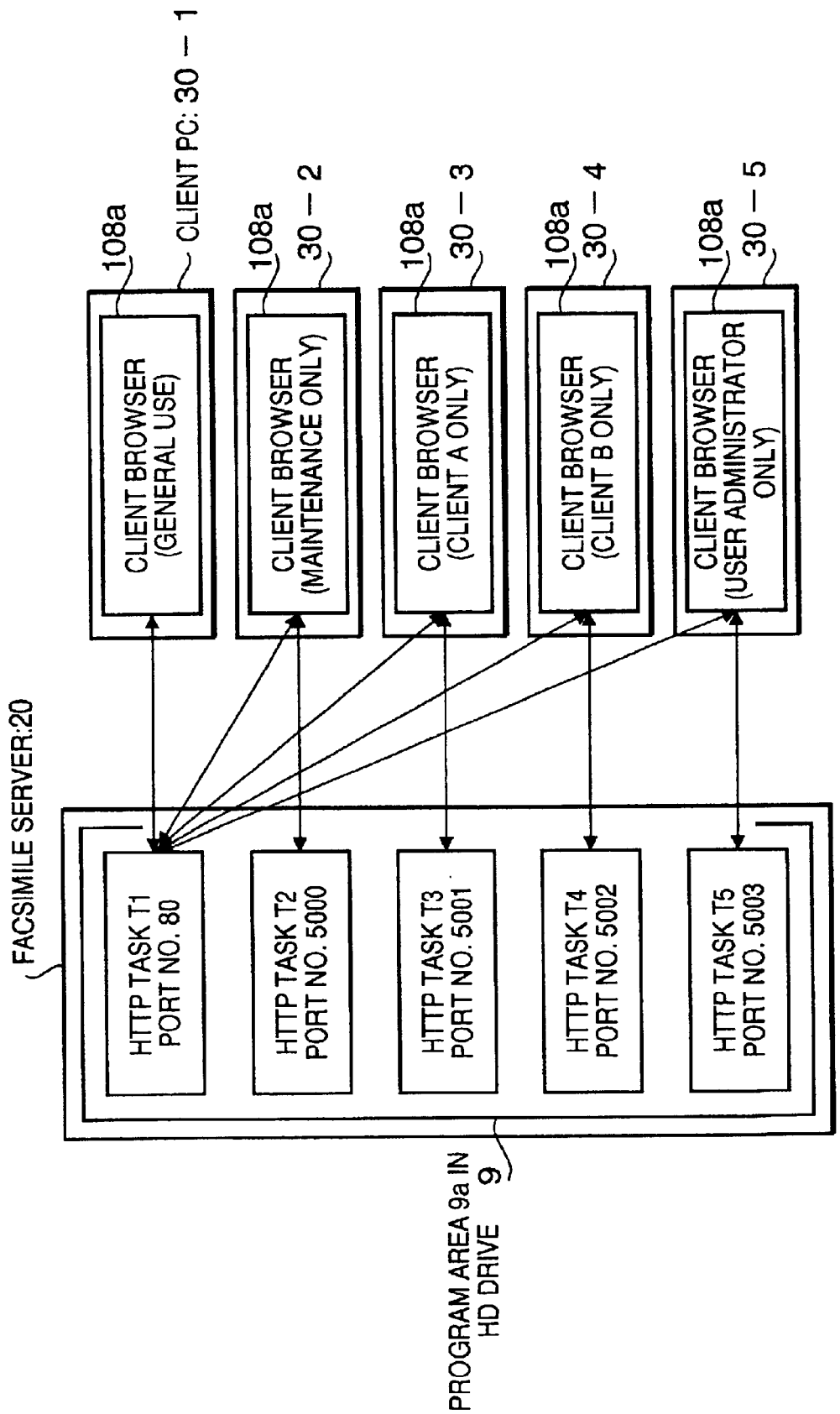

WEB SERVER AND FACSIMILE MACHINE HAVING WEB SERVER FUNCTION

CROSS REFERENCES TO RELATED APPLICATIONS

This application claims priority under 35 USC 119 of Japanese Patent Application No. 2000-167199 filed in JPO on Jun. 5, 2000, the entire disclosure of which is incorporated herein by reference.

BACKGROUND OF THE INVENTION

1. Field of the Invention

The present invention relates to a web server and an apparatus such as a facsimile server having a web server function.

2. Description of the Related Art

Recently practiced is a facsimile system in which a facsimile server having a facsimile data sending/receiving function and connected to a communication line or network such as PSTN (Public Subscriber Telephone Network) is further connected to a client machine such as a personal computer via a computer network such as a local area network (referred to as "LAN" hereinafter). In this conventional facsimile system, the client machine sends a transmission command signal including image data and recipient information to the facsimile server, and the facsimile server sends the image data to a recipient over the PSTN. When, on the other hand, the facsimile server receives image data over the PSTN, it transfers the image data to a designated client so that that client can have that image data.

In the prior art, a facsimile server machine is equipped with a web server function so that it is possible to see and update/rewrite internal settings and operation conditions of the facsimile server using a browser of a client personal computer. The browser is a look-over or perusal program for reading data from a web server via a computer network such as the Internet or LAN, for displaying the data, for inputting data, for setting data and for monitoring the operation.

In the conventional facsimile server, however, any people including general users, maintenance service engineers and special users can access the facsimile server since no limitations/prohibitions are imposed on a certain kind of accessing party. As a result, a general user may accidentally rewrite the internal settings of the facsimile server.

SUMMARY OF THE INVENTION

An object of the present invention is to provide a facsimile machine such as a facsimile server that can eliminate the above described problems.

Specifically, a primary object of the present invention is to provide a facsimile server that allows each client personal computer to easily access a facsimile machine or a facsimile server on one hand and that prevents a general user from performing an unexpected operation such as rewriting of the internal operation data of the facsimile server.

According to one aspect of the present invention, there is provided a facsimile apparatus having a web server function, comprising control means for executing a plurality of HTTP tasks having a plurality of different port numbers on the basis of instructing information from a plurality of client machines operated by a plurality of users, and storage means for storing a table that defines relationship between the port numbers of the HTTP tasks and the users, wherein the control means refers to the table to execute the HTTP tasks having port numbers which process specified information corresponding to the users. Since the port numbers are allotted to the HTTP tasks respectively, a user is only required to specify a port number of a desired HTTP task with URL.

In the table, the order of priority may be appended to the HTTP task port numbers. The control means may execute the HTTP tasks in compliance with this order of priority. In case of emergency such as machine failure, emergency measures such as repairing and restarting of the machine can promptly be taken in accordance with the order of preference, prior to less important general tasks.

The specified information may be maintenance information when the user is a maintenance engineer of the facsimile apparatus. Alternatively this information may be user administration information when the user is a user administrator of the facsimile apparatus. Accordingly, the maintenance engineer may only be allowed to rewrite the maintenance data in the apparatus, and the administrator may only be able to access the administration data. Since other general users cannot reach these data, it is possible to prevent accidental or unexpected rewriting of the data.

The facsimile apparatus may further include authentication means for giving authentication to some of the client machine users based on predetermined authentication information entered by these users when the control means executes one or more of the HTTP tasks. This improves security regarding the web server function and prevents undesired rewriting of the data.

These and other objects, aspects and advantages of the present invention will become apparent to those skilled in the art to which the present invention pertains from the subsequent detailed description and appended claims when taken in conjunction with the accompanying drawings.

BRIEF DESCRIPTION OF THE SEVERAL VIEWS OF THE DRAWINGS

FIG. 4 illustrates an exemplary HTTP task table shown in FIG. 3; and

FIG. 5 illustrates the relationship between HTTP tasks of the facsimile server and the client personal computers.

DETAILED DESCRIPTION OF THE INVENTION

An embodiment of the present invention will now be described in reference to the accompanying drawings.

Figure 1:
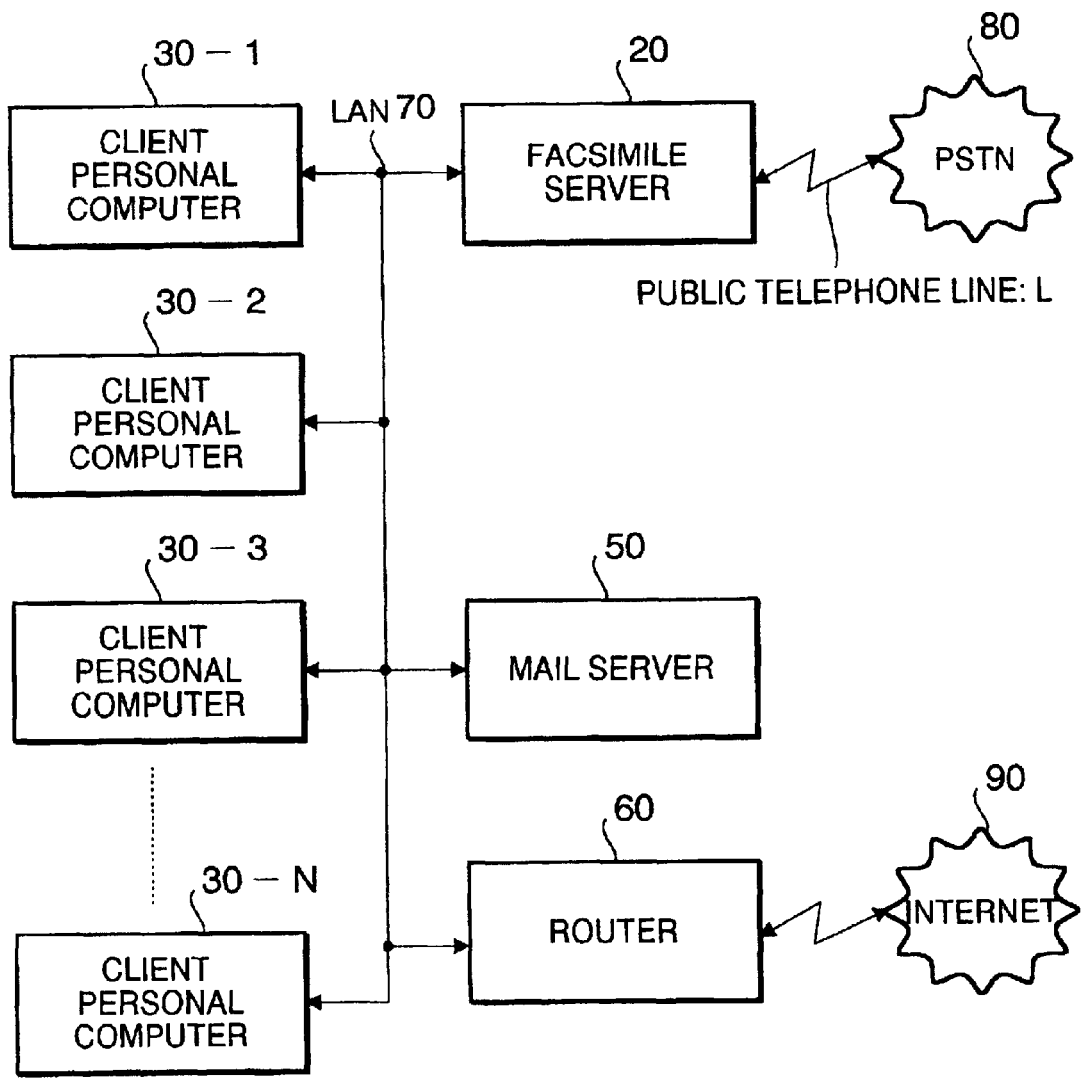
FIG. 1 is a block diagram showing a structure of a facsimile system including a facsimile server apparatus with a web server function according to the present invention.

Referring to FIG. 1, illustrated is a facsimile system including a facsimile sever apparatus 20 with a web server (or WWW (World Wide Web) server or HTTP (Hypertext Transfer Protocol) server) function according to the present invention. The term "web server function" is a function of accessing to data written, for example, in HTML (Hypertext Markup Language), which is used for a homepage, from client personal computers 30-1 to 30-N (collectively referred to as 30) to execute a desired HTTP task (or HTTP server task). The HTTP task includes, for instance, a task of transferring data from a database to the client personal computers 30 such that the data is displayed and the internal settings of the personal computers are changed. In the facsimile system of this embodiment, a plurality of client personal computers (PCs) 30, the facsimile server 20 connected to PSTN 80 via a public telephone line L, a mail server 50, and a router 60 connected to the Internet 90 are connected to each other over LAN 70.

The facsimile server 20 of the illustrated embodiment is characterized by having a web server function. A main controller 1 (FIG. 3) of the facsimile server 20 executes a plurality of HTTP tasks having different port numbers, on the basis of instructing information from the respective client personal computers 30, which are operated by respective users. The facsimile server 20 includes a hard disc drive 9 for storing a table 9b, an example of which is illustrated in FIG. 4, in which the task port numbers of the respective HTTP tasks are associated with the respective users. The main controller 1 refers to the HTTP task table 9b to execute a particular HTTP task having a port number which processes specified information corresponding to that user.

In this embodiment, the HTTP task table 9b in the hard disc drive 9 has, as illustrated in FIG. 4, the order of priority with respect to the numbering of the port numbers of the HTTP tasks. The main controller 1 of the facsimile server 20 executes the HTTP tasks on the basis of this order of priority defined in the HTTP task table 9b. In the embodiment, the specified information is maintenance information if the user is a maintenance person (or engineer) of the facsimile machine, and is user administration information if the user is a user administrator of the facsimile machine.

When the main controller 1 of the facsimile server 20 performs the HTTP tasks T2 to T5 among those defined in the table 9b of FIG. 4, it utilizes an associated authentication means for giving authentication to a user of a client personal computer 30 on the basis of user ID (identification) information and authentication information, including a password, entered by the user.

Figure 3:
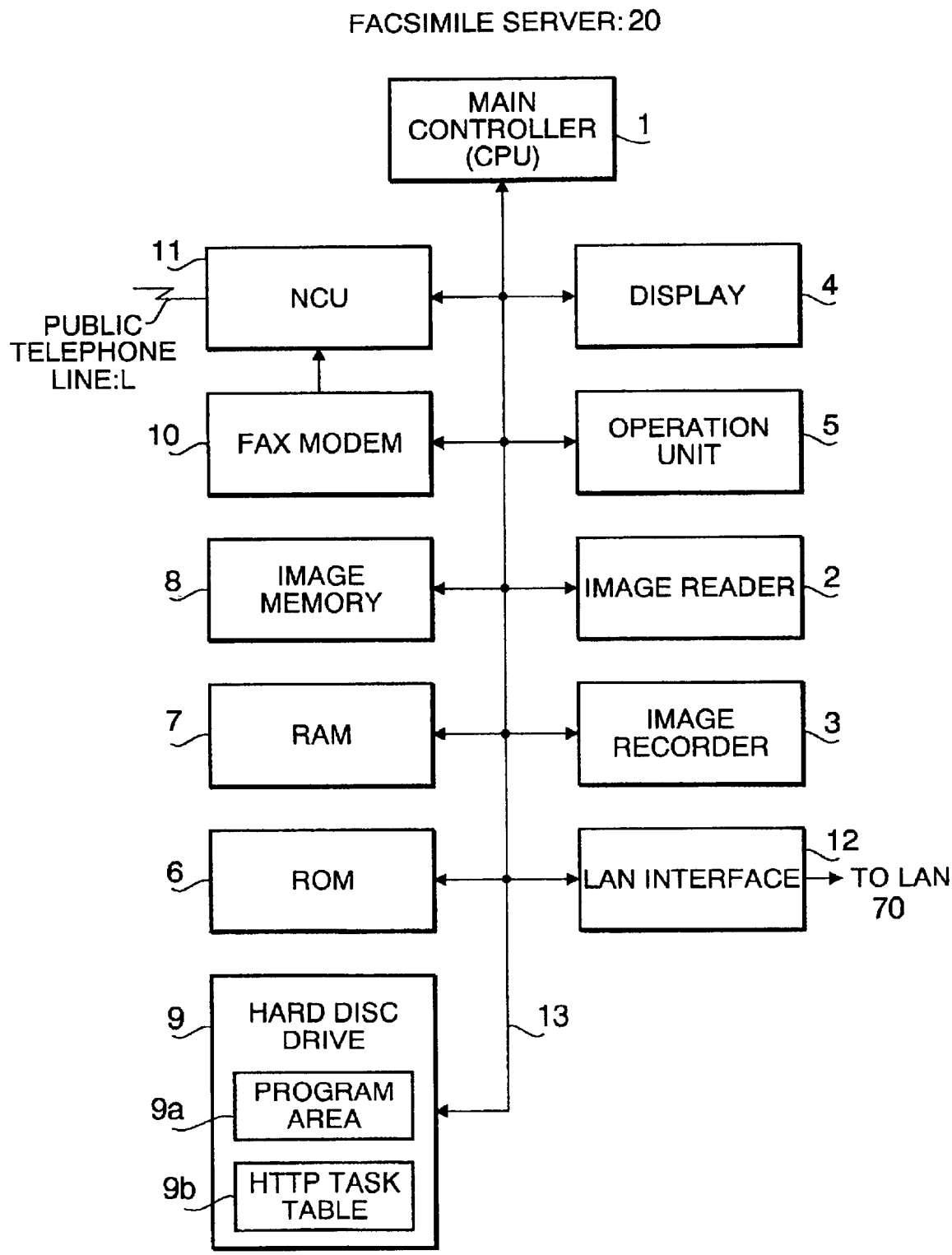
FIG. 3 is a block diagram showing a structure of a facsimile server depicted in FIG. 1.

As illustrated in FIG. 1, the mail server 50 receives an email from a remote party's mail server (not shown) over the Internet 90 and LAN 70. If the received email contains image data encoded with MIME, the mail server 50 holds the email together with the image data. Subsequently, the email including the image data is taken out from the facsimile server 20 and decoded, and the image data is stored in an image memory 8 of the facsimile server 20 (FIG. 3).

Figure 2:
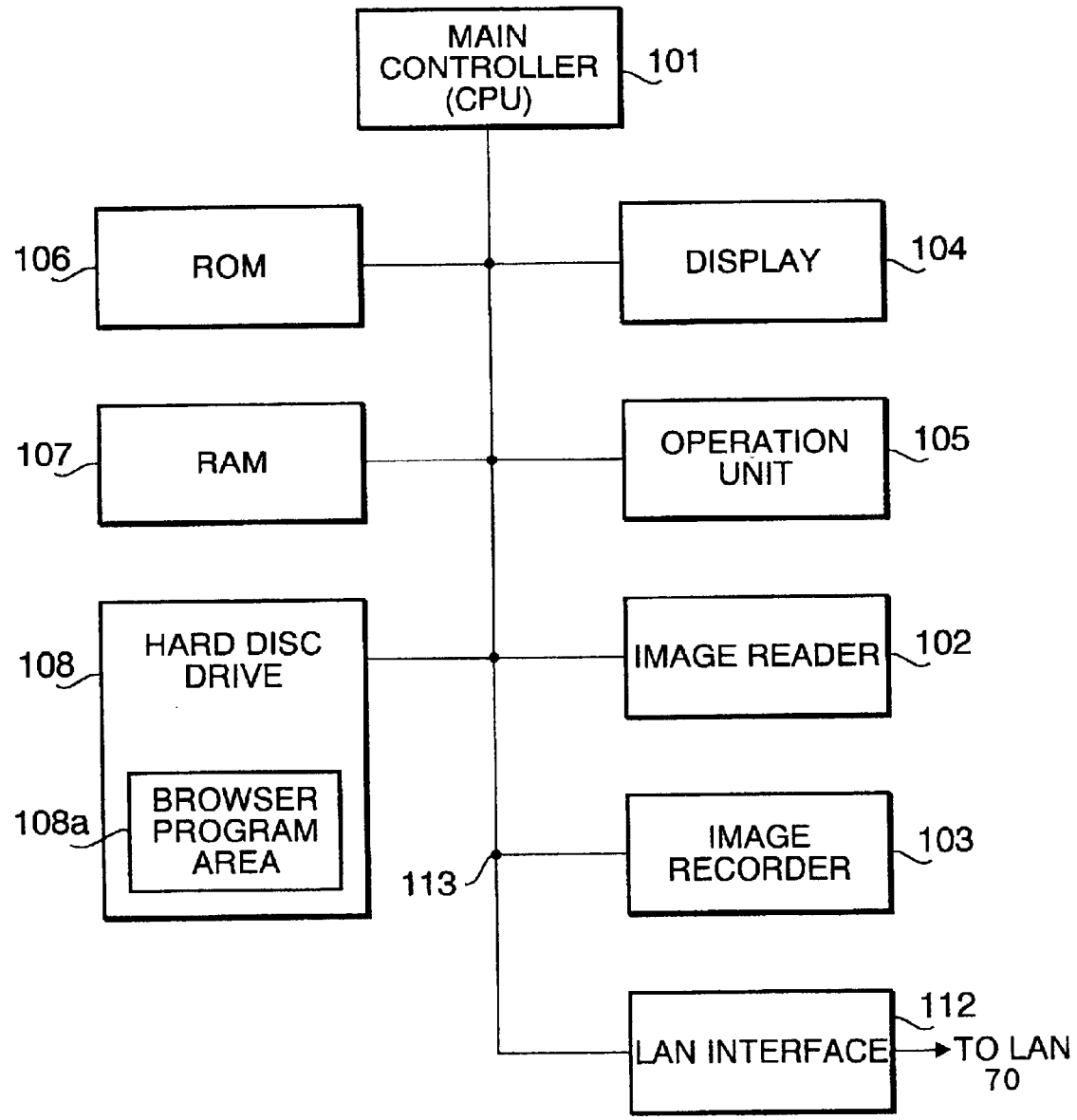
FIG. 2 is a block diagram showing a structure of a client personal computer depicted in FIG. 1.

Referring to FIG. 2, illustrated is a structure of the client personal computer 30 shown in FIG. 1. In this drawing, the client personal computer 30 is a conventional personal computer and designed to execute various processing such as generation and recordation (printing) of image and character data. In this embodiment, the client personal computer 30 is employed as a terminal device for receiving and sending image data of facsimile transmission, for example. A main controller 101 is constituted by CPU and connected to various hardware (will be described) over a bus 113 for controlling the hardware. The main controller 101 is also adapted to perform diverse software functions (will be described). In this client personal computer 30, an image reader (scanner) 102 and image recorder (printer) 103 are optionally provided. The image reader 102 uses a scanner including CCD (Charge Coupled Device) or the like to read in an original paper/document such that it converts the original document into black-white binary data and outputs it as dot image data. The image recorder 103 is, for example, an electrophotographic printer, and prints image data received from another facsimile server by way of facsimile transmission on a recording sheet as hard copy or prints character data. A display unit 104 includes LCD (liquid crystal display) or CRT (cathode ray tube) and displays an operating condition of the client personal computer 30 and image data of an original document to be sent or received. An operation unit 105 may be a control panel or keyboard for a user to input character data and instruction commands.

ROM 106 stores various software programs required for the client personal computer 30 to operate properly. These programs are executed by the main controller 101. RAM 107 may be SRAM, DRAM or SDRAM and is used as a working area of the main controller 101 to temporarily store data generated during execution of the program(s) related to the facsimile machine 1.

A hard disc drive 108 is a storage device including a storage media, which stores application programs and image data. For instance, a browser program needed to access web server data is stored in a browser program area 108a of the hard disc drive 108. By specifying the browser program in the browser program area 108a from the operation unit 105 for execution, a HTTP task in the facsimile server 20 is carried out via LAN 70 and/or another web server (not shown) is accessed over the router 60 and Internet 90. A user then operates the operation unit 105 to download necessary information and data, and stores them in, for example, the hard disc drive 108. A LAN interface 112 is connected to LAN 70 to accept and send signals and data over LAN 70 so as to perform interface processing such as signal conversion and protocol conversion.

Referring to FIG. 3, illustrated is a block diagram of the facsimile server 20 of FIG. 1. In this illustration, the facsimile server 20 has a web server function in addition to a general G3 facsimile communication function. Its main controller 1 is CPU and connected to hardware via a bus 13 to control the hardware and to perform various software (will be described).

An image reader 2 is a scanner including, for example, CCD to read an original document so as to output dot image data made of black-white binary data. An image recorder is, for example, an electrophotographic printer to print image data received from a remote facsimile machine in the form of hard copy and to print character data.

A display unit 4 is LCD or CRT to indicate an operating condition of the facsimile server 20 and image data of an original document to be sent or received. An operation unit 5 includes character keys, numeric keys, speed-dial keys, one touch dial keys and function keys needed to operate the facsimile server machine 20. It should be noted that the display unit 4 may be a touch panel screen, and all or some of the keys on the operation unit 5 may be included in the touch panel.

ROM 6 has stored various software programs executed by the main controller 1. Such programs are required by the facsimile server machine 20 to properly operate. RAM 7 is SRAM, DRAM, SDRAM or the like, and utilized as a working area for the main controller 1 to store temporary data produced upon execution of the program(s). If RAM 7 is a flash memory, it maintains data even if electric interruption occurs due to power failure or relocation of the machine. The image memory 8 is DRAM or the like to store image data to be sent to and received from a remote machine.

A hard disc drive 9 is a storage device including a storage medium. The hard disc drive 9 includes a program area 9a for storing a program related to the HTTP tasks of the web server, and an HTTP task table 9b such as that illustrated in FIG. 4 (will be described).

A fax modem 10 is a modem connected to the public telephone line L and designed to have an ordinary fax modem function. NCU (Network Control Unit) 11 connects to and disconnects from a DC loop of the public telephone line L. NCU 11 is also a hardware circuit having an automatic dialing function so that it can connect the fax modem 10 to the public telephone line L if necessary. NCU 11 detects an ID receiving terminal activation signal in a calling party's telephone number notification service and an ordinary calling indication signal. NCU 11 also issues a primary response signal and a secondary response signal in the calling party's telephone number notification service if the circumstances demand. It should be noted that NCU 11 may be connected to a digital subscriber network of baseband transmission type (e.g., ISDN) via a certain terminal adapter and DSU (Digital Service Unit).

A LAN interface 12 is connected to LAN 70 to receive signals and data from LAN 70, and issues signals and data to LAN 70. Thus, the LAN interface 12 performs interface processing such as signal conversion and protocol conversion.

The facsimile server 20 has a web server function. In the facsimile communication function, the dot image data transmitted from the client personal computer(s) 30 or dot image data scanned by the image reader 2 is encoded by the software according to an encoding scheme such as MH, MR or MMR defined in the facsimile communication standards. The dot image data is then sent to a remote facsimile machine. On the other hand, when encoded data is received from a remote facsimile machine, it is decoded into image data by the software and stored in the image memory 8. This image data is printed by the image recorder 3, if necessary.

In the illustrated embodiment, the facsimile server 20 encodes and decodes the facsimile data, but the client personal computer(s) 30 may have a software for encoding and decoding the facsimile data and perform the encoding and decoding processing by themselves. In such a case, the image data transmitted over LAN 70 and those stored in the image memory 8 are the encoded image data. Such encoded image data is not limited to the encoded image data for facsimile communication; it may be image data of a particular format such as GIF, JPEG and PDF. The facsimile server 20 will convert the image data of such a format to an encoded format for facsimile communication.

Referring to FIG. 4, illustrated is an example of the HTTP task table 9b of FIG. 3. As shown, each of the HTTP tasks has a port number, use, authentication, URL (Uniform Resource Locators; HTTP address), and the order of priority when performing the HTTP tasks. In this table, the HTTP task T1 is a general task related to a home page such as a bulletin board disclosed to all the users of the client personal computers 30, and the HTTP tasks T3 and T4 are tasks dedicated to authorized clients only. The HTTP task T2 is a maintenance-specific task for a maintenance engineer who maintains the facsimile server 20. Specified information handled in this task is maintenance information of the facsimile server 20 (e.g., equipment information, machine inside setting information, speed dial information, user information, ID information, TTI information and authentication information). The HTTP task T5 is a task dedicated to user administration, which is used by an administrator of a user of the facsimile server 20. Specified information handled in this task is user administration information of the facsimile server 20 (e.g., transmission reservation report, communication administration report including transmission result report (succeeded or failed/returned), and usage administration report for respective groups).

Referring to FIG. 5, illustrated is the relationship between the facsimile sever 20 and the respective client personal computers 30 (30-1 to 30-5) with respect to the HTTP tasks of this embodiment. As apparent from this drawing, the HTTP task T1 can be accessed from any client personal computer (PC) 30 in LAN 70. On the other hand, the HTTP tasks T2 to T5 require ID and password authentication. Specifically, the HTTP tasks T2 to T5 can be accessed from certain client PCs 30-2 to 30-5 respectively. In this manner, the security is ensured regarding the respective tasks. Therefore, it is possible to prevent a general user from rewriting the settings of the facsimile server.

In the facsimile server 20, the HTTP task table 9b indicates the order of priority for the HTTP tasks (or port numbers), and the main controller 1 of the facsimile server 20 executes the HTTP tasks in compliance with the order of priority determined in the HTTP task table 9b. A term "multi-task" is used for parallel or concurrent execution of a plurality of programs, which is one of the functions of the OS (operating system). The main controller 1 can execute only one task at one moment so that it is necessary to switch the tasks at particular timings in order to activate a plurality of programs. If the switching takes place very quickly, a user will see that a plurality of tasks are proceeding simultaneously. In this embodiment, when the main controller 1 executes a particular HTTP task, it does not execute other HTTP tasks of lower priority on the basis of the order of priority defined in the table 9b shown in FIG. 4. By doing so, an emergency measure such as repair and restart of the machine is promptly and reliably taken prior to less important (or lower priority) general processing when machine failure or the like occurs.

Now, a procedure for the client PCs 30 to execute the HTTP tasks of the facsimile server 20 will be described. This procedure uses a known HTTP (Hypertext Transfer Protocol).

(1) A user of the client PC 30 activates a browser and specifies an HTTP address. In this embodiment, the port number is specified on URL so that one of the HTTP tasks T2 to T5 is selected. In response to this, the client PC 30 retrieves a server at the specified HTTP address, and requests an HTML source. In the illustrated embodiment, the server is the facsimile server 20.

(2) In response to this, the facsimile serve 20 refers to the HTTP task table 9b using the specified URL to execute the specified HTTP task. For example, if it is a general home page, the HTML file of the home page is read into RAM 7 from the program area 9a of the hard disc memory 9, and then transferred to the requesting client PC 30. It should be noted that the HTTP tasks T2 to T5 are executed only when the authentication is made on user ID information and password before execution.

(3) Upon receiving the HTML source, the client PC 30 analyzes and displays it on the screen 104. If an image and/or data is linked, the client PC 30 sends a transfer request to the facsimile server 20 for the image and data.

(4) Upon the transfer request, the facsimile server 20 sends the requested information to the client PC 30. The facsimile server 20 then enters a stand-by condition to receive another request from the client PC 30.

(5) The client PC 30 displays the image on the screen 104 as it receives it from the facsimile server 20. While a user is referring to the display screen, there is no communication between the client PC 30 and the web server (i.e., facsimile server 20).

As understood from the foregoing, the facsimile server 20 has a web server function, and the main controller 1 of the facsimile server 20 executes a plurality of HTTP tasks having different port numbers on the basis of the instructing information from the respective personal computers 30 operated by the respective users. The facsimile server 20 also has the hard disc drive 9 for storing the HTTP task table 9b that defines the relationship between the respective HTTP task port numbers and the users. The main controller 1 refers to this table 9b to execute a particular HTTP task having a port number which processes specified information corresponding to a user concerned. Accordingly, the users can easily utilize and access certain contents of the facsimile server by simply specifying a port number with URL when a plurality of ports are available.

In this embodiment, the HTTP task table 9b created in the hard disc drive 9 has the order of preference in connection to the port numbers of the HTTP tasks as shown in FIG. 4 so that the main controller 1 of the facsimile server 20 performs the HTTP tasks based on the order of preference defined in the table 9b. It is therefore possible to promptly take an emergency measure such as repair and restart of the apparatus prior to less important general tasks in case of emergency such as malfunctioning or failure of the apparatus.

In the described embodiment, when the user is a maintenance engineer of the facsimile server 20, the information specific to the user is maintenance information. If the user is a user administrator of the facsimile server 20, the specified information is user administration information. Accordingly, only the maintenance engineer and user administrator can refer to the information needed for their maintenance activities and administration activities respectively, and other users cannot refer to the maintenance and user administration information. As a result, it is possible to prevent improper access from unauthorized users.

When the main controller 1 of the facsimile server 20 conducts one of the HTTP tasks T2 to T5 among those available in the table 9b of FIG. 4, it uses an authentication means for authenticating or refusing a user of the client personal computer 30 based on the authentication information including the password and user ID information entered by the user. This improves security in the web server function and prevents an improper user from accessing.

Although the foregoing deals with the facsimile server 20, the present invention is not limited in this regard. For example, the present invention is applicable to a general facsimile machine equipped with a LAN board, or to a communication terminal device such as a telephone or a data communication device connected to a public line or network such as PSTN or PSDN. It is also of course that the present invention can be applied to a common web server.

What is claimed is:

1. A facsimile apparatus having a web server function, comprising:
   control means for executing a plurality of HTTP tasks having different port numbers on the basis of instructing information from a plurality of client machines operated by a plurality of users; and
   storage means for storing a table that defines relationship between the port numbers of the HTTP tasks and specified information, wherein the control means refers to the table to execute the HTTP tasks having port numbers which process specified information corresponding to the users, wherein
   the specified information is maintenance information when the user is a maintenance engineer of the facsimile apparatus, and is user administration information when the user is a user administrator of the facsimile apparatus.

2. The facsimile apparatus having a web function according to claim 1, wherein the table has an order of priority with respect to the HTTP task port numbers, and the control means executes the HTTP tasks in compliance with the order of priority allotted to the HTTP task port numbers.

3. The facsimile apparatus having a web function according to claim 2 further including authentication means for giving authentication to some of the client machine users based on predetermined authentication information entered by these users when the control means executes some of the plurality of HTTP tasks.

4. The facsimile apparatus having a web function according to claim 1 further including authentication means for giving authentication to some of the client machine users based on predetermined authentication information entered by these users when the control means executes some of the plurality of HTTP tasks.

5. The facsimile apparatus having a web function according to claim 1 further including authentication means for giving authentication to some of the client machine users based on predetermined authentication information entered by these users when the control means executes some of the plurality of HTTP tasks.

6. A web server comprising:
   control means for executing a plurality of HTTP tasks having different port numbers on the basis of instructing information from at least one client machine; and
   storage means for storing a table that defines relationship between the port numbers of the HTTP tasks and user ID information of the respective client machine, wherein the control means refers to the table to decide which HTTP tasks should be executed on the basis of the port numbers and user ID information,
   wherein the table includes a label "authenticated" or "not authenticated" to each of the HTTP task port numbers under a predetermined rule, and the control means executes the HTTP tasks having those port numbers to which the labels "authenticated" are appended.

7. The web server according to claim 6, wherein the table has an order of priority with respect to the HTTP task port numbers, and the control means executes the HTTP tasks in compliance with the order of priority allotted to the HTTP task port numbers.

8. An apparatus having a web server function, comprising:
   a controller for executing at least one HTTP task on the basis of instructing information from at least one client machine; and
   a table for defining relationship between the respective HTTP task and the respective client machine, wherein the controller refers to the table to execute the HTTP tasks having port numbers which process specified information corresponding to the users, wherein
   the specified information is maintenance information when the user is a maintenance engineer of the apparatus, and is user administration information when the user is a user administrator of the apparatus.

9. The apparatus having a web function according to claim 11, wherein the table has an order of priority with respect to the respective HTTP task, and the controller executes the respective HTTP task in compliance with the order of priority.

10. The apparatus having a web function according to claim 8, wherein the controller gives authentication to the respective client machine based on authentication information entered by the respective client machine when the controller executes the respective HTTP task.

* * * * *